(12) United States Patent
Stewart

(10) Patent No.: US 7,027,389 B2
(45) Date of Patent: Apr. 11, 2006

(54) FAST FAILURE DETECTION USING RTT TIME CONSIDERATIONS ON A NON-RETRANSMIT MEDIUM

(75) Inventor: Randall R. Stewart, Crystal Lake, IL (US)

(73) Assignee: Cisco Technology, Inc., San Jose, CA (US)

(*) Notice: Subject to any disclaimer, the term of this patent is extended or adjusted under 35 U.S.C. 154(b) by 815 days.

(21) Appl. No.: 09/734,783

(22) Filed: Dec. 11, 2000

(65) Prior Publication Data

(51) Int. Cl.
*H04L 12/16* (2006.01)

(52) U.S. Cl. .................. 370/218; 370/249; 379/22.01; 714/716

(58) Field of Classification Search ............... 370/218, 370/221, 222–225, 234, 242, 244, 246, 249, 370/250, 252, 253; 379/1.03, 22.01, 32.01, 379/32.02, 32.04; 714/712, 716, 750, 821
See application file for complete search history.

(56) References Cited

U.S. PATENT DOCUMENTS

| | | | |
|---|---|---|---|
| 5,170,391 A * | 12/1992 | Arnold et al. | 370/232 |
| 5,513,185 A * | 4/1996 | Schmidt | 714/708 |
| 5,563,874 A * | 10/1996 | Kant | 370/252 |
| 6,134,221 A | 10/2000 | Stewart et al. | 370/252 |
| 6,442,140 B1 * | 8/2002 | Kirschenbaum | 370/236.1 |
| 6,545,979 B1 * | 4/2003 | Poulin | 370/241.1 |
| 6,687,251 B1 * | 2/2004 | Mousseau et al. | 370/401 |

OTHER PUBLICATIONS

Stewart, et al. "Stream Control Transmission Protocol", IETF Specification, Network Working Group, Oct. 2000, pp. 1-135.

Xie, et al. "SCTP Unreliable Data Mode Extension", IETF Specification, Network Working Group, Nov. 15, 2000, pp. 1-14.

* cited by examiner

*Primary Examiner*—Wellington Chin
*Assistant Examiner*—John Shew
(74) *Attorney, Agent, or Firm*—Sierra Patent Group, Ltd

(57) ABSTRACT

The present invention provides a method and apparatus to determine the state of a communications link between two nodes in a network. Typically, each node will have an RTT-based value to use, a packets sent counter, and a threshold number to use against the packet sent counter to determine if there is a problem with their communications link. Using the RTT value makes the failure detection sensitive to the actual state of the communications link at any particular time; it also allows the failure detection algorithm to take into account the bursty nature of nodes in a packetized network connection. For each packet received from a non-local node, the local node sets the counter to 0 and starts a new RTT-based time interval. The local node then increments the counter only once, regardless of how many packets it sends to the non-local node, during the RTT-based time interval. Once the time interval is up, the counter is incremented for each packet sent. The counter is compared to the fixed threshold value to determine if it is likely a communications link failure has occurred.

20 Claims, 2 Drawing Sheets

Example Use And Component Location According To The Current Invention

Use Of Present Invention

US 7,027,389 B2

FAST FAILURE DETECTION USING RTT TIME CONSIDERATIONS ON A NON-RETRANSMIT MEDIUM

BACKGROUND OF THE INVENTION

1. Field of the Invention

This invention pertains generally to communications systems. In particular, this invention discloses a method and apparatus for detecting a failure condition between two communications nodes with improved reliability (fewer false failures) than previous detection methods.

2. The Prior Art

Packetized methods of communicating between sites or nodes on a network are well known. A relatively recent application of packetized communications is Voice over Internet Protocol (VoIP), where voice communications, which are typically transmitted using multiplexed analog based technologies, are instead transmitted in a packetized fashion. Used in this context, the packets are commonly referred to as datagrams.

When using VoIP, each communication site or node on the VoIP network sends datagrams to other communication sites or nodes. When data integrity is important, packets can be sent utilizing reliable protocols, that is, protocols that will use error control, acknowledgements, and other techniques that increase the reliable transmission of each datagram.

However, because of the real-time limitations of delivering a realistic voice message (when compared to other applications such as text transmittal) there is often not enough time to detect failures in the transmission path—missing packets, a downed intermediate node creating added transmission time for a set of datagrams, etc. Normally the damaged or missing datagrams are rejected or ignored by the receiving node, as there is no time to send a request for a retransmit and to wait for a response from the source node.

This leads to a situation where the two end nodes (or communication sites) do not detect a break in the transmission until a significant amount of time has passed, or don't detect the communications break at all, and the link is lost.

There have been recent attempts to correct this situation, with the most apropos solution found in U.S. Pat. No. 6,134,221 issued Oct. 17, 2000, by Stewart et al. Stewart reveals a method where two end nodes, who are communicating using datagrams, each have two counters and two thresholds. There is one threshold for each counter. The two counters at each node consist of one "messages sent" counter and one "messages received" counter. Basically, one counter is used to determine if the local node has sent too many messages without getting a response (conclusion—communication path is down). To handle the case where a communication may be one-sided for specific intervals during the life of the overall communication, that is, where one would expect to send a large number of datagrams without receiving any, the other counter is used to allow the receiving node to know when to send a periodic equivalent of an "I'm alive and receiving" message to the sender. The actual datagram sent for this case is typically the null datagram. For further details, see U.S. Pat. No. 6,134,221.

The method disclosed in Stewart et al. has some serious shortcomings when put to actual use. A primary failure is its inability to deal with the "bursty" nature of the transmission media. That is, if either of the two end nodes, or an intermediate routing node, is temporarily subjected to a high peak workload such that the process handling the transmission in questions is swapped out, it may appear to the node where the process is still active that the transmission path has failed. In addition, even if the swapped process becomes active in time to send before the receiving process decides it has lost a connection, the newly active process will tend to send a large burst of traffic (a relatively large number of datagrams) all at once. This causes the sent counter to increment faster than a datagram can be received from the target node, which will be misread by the sender as a false failure of the receiving node. That happens because the expected "I'm alive" datagram coming from the target node cannot be received by the time the sending node has incremented its sent counter past the number when an "I'm alive" datagram would ordinarily have been expected due to the quick burst of datagrams sent.

Thus, a need exists for a more reliable method and apparatus for evaluating a communication link between nodes using packets, datagrams, or any packetized protocol.

BRIEF DESCRIPTION OF THE INVENTION

The present invention discloses the use of an RTT (round trip time) based method and apparatus for detecting communications link failures between two communications nodes using a packetized communications protocol. The advantage this has over previous solutions is that by using a time element, rather than a packet counting-based method devoid of any time considerations, communications link trouble may be detected both quickly and with far more reliability (fewer false failure alarms) than using previous methods.

The disclosed invention uses one packet sent counter, an RTT-based time interval, a regular ACK or SACK packet sending capability, and a heuristically derived threshold value per node to determine the status of a communications link between two nodes. The counter is set to 0, and a new RTT-based time interval started, each time a packet is received by a node. When the node sends packets, the sent counter is incremented by one, and only one, while the RTT-based time interval has not been exceeded. As soon as the RTT-based time interval is exceeded, each sent packet increments the counter by one. If the counter exceeds the threshold value, it is assumed a communications link failure has occurred.

BRIEF DESCRIPTION OF THE DRAWING FIGURES

DETAILED DESCRIPTION OF PREFERRED EMBODIMENTS

Person of ordinary skill in the art will realize that the following description of the present invention is illustrative only and not in any way limiting. Other embodiments of the invention will readily suggest themselves to such skilled persons having the benefit of this disclosure.

The present invention provides a method for evaluating a communication link between two nodes in a packet network. Each node, once an association has been made between the two, increments a packet (datagram, data block, cell, message) sent counter when a packet is first sent within an RTT (Round Trip Time) interval, and will continue to increment the packet sent counter each time a packet is sent if those packets are sent after the endtime of the current RTT interval. Any packet received from the other node resets the sent counter to 0, and begins a new RTT interval. Each node compares the sent counter to a local sent threshold to see if it has exceeded a certain number. If so, this indicates that the communications path the two nodes had been using is down, as the local node is no longer receiving packets from the other node.

Figure 1:
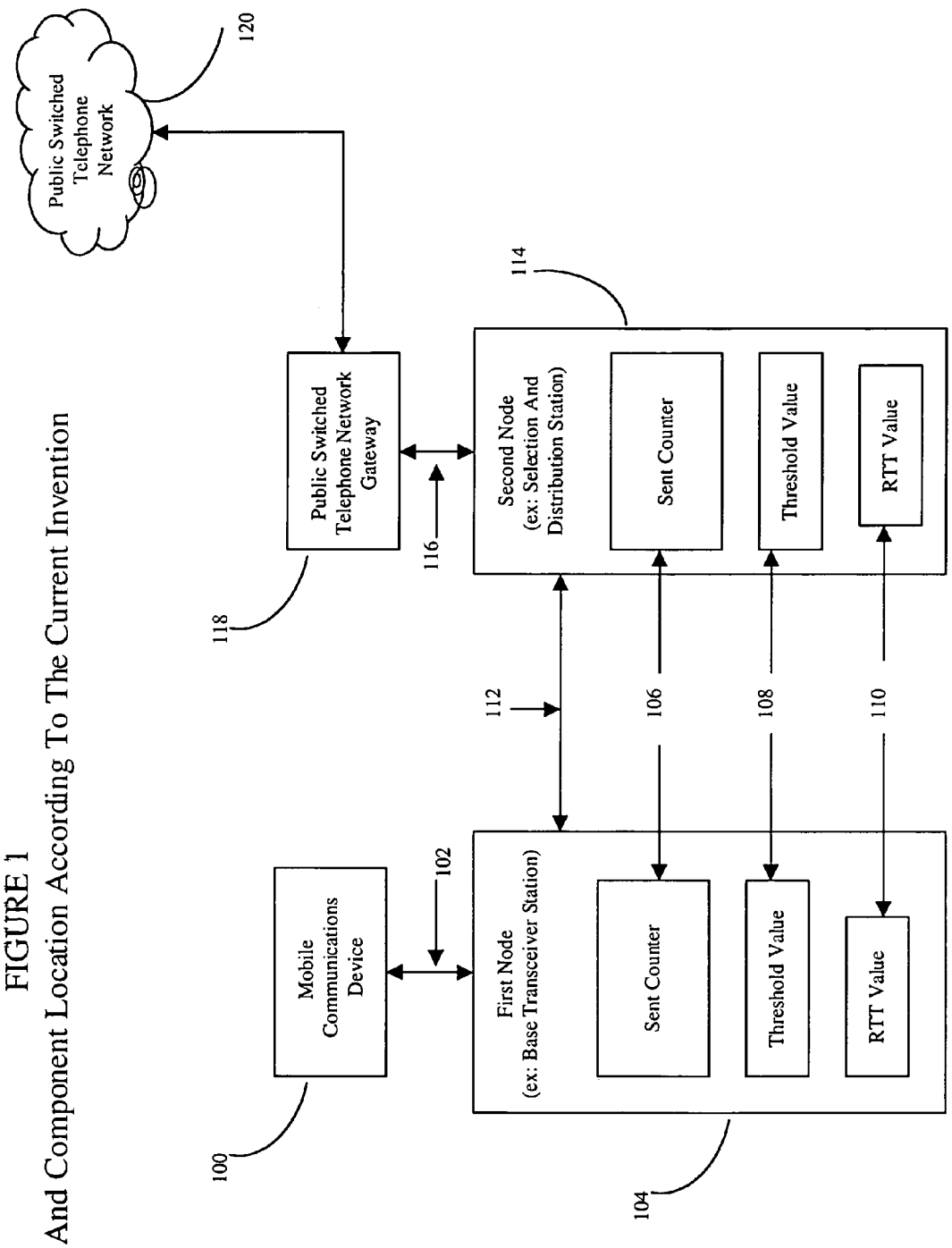
FIG. 1 is a block diagram of the current invention in a preferred use.

The present invention is shown in block form in FIG. 1, embedded in a preferred embodiment. The diagram shows a mobile communications device 100 in operable communications over communications link 102 with node 104. Node 104 is shown as a first node, and in this case is a base transceiver station. It has an association with a second node, node 114. In this embodiment node 114 is a selection and distribution node, and is in operable communication with node 104 via communications link 112. Communications link 112 is a VoIP link in this case. Node 114 has a communications link 116 to a PSTN gateway (Public Switched Telephone Network), which is connected to a standard PSTN 120. A particular communications linkage, at the physical level, may or may not extend over the life of a communications session. A communications session between nodes is one in which two endpoints, or end nodes, remain the same.

For the purposes of this disclosure, the connection of primary interest is VoIP communications link 112 between node 104 and node 114. In a preferred embodiment, the protocol in use would be SCTP over IP (Stream Control Transmission Protocol over Internet Protocol). Details of the protocols are publicly available and will not be discussed in unneeded detail; please refer to the IETF (Internet Engineering Task Force) at www.ietf.org for further information and details of the SCTP (Stream Control Transmission Protocol), including its use and specification of RTT (Round Trip Time) and SACK (Selective ACKnowledgement) packets (http://www.ietf.org/rfc/rfc2960.txt?number=2960).

Although the preferred embodiment of the present invention makes use of the RTT calculation ability built into SCTP, and uses SACKs for both RTT purposes and counter reset purposes, it will be readily apparent to a person of ordinary skill in the art and with the benefit of the present disclosure that any two nodes communicating using any type of packet-based protocol can make use of the current invention by using, or implementing, functionality that is the equivalent of that described herein using SCTP-specific terms.

RTT is the amount of time a packet has taken to make the trip from the originating node, to the target node, and back. There can be minor technical differences in the way RTT is specified for different networks and protocols; all such variations are fully contemplated by the present invention and remain within the inventive nature of the present disclosure. In addition, the SCTP protocol uses a SACK packet that is sent to the originating node from the target node at every other packet. The SACK packets are also used to update the current RTT value. For specific implementation details, see the SCTP protocol specifications referenced in the last paragraph.

For the purposes of this disclosure the important details are that SACK packets are generated by the target node for every other packet received from the originating node, and the SACK packets provide updated RTT interval information. RTT is the time it is taking to make a round trip from the originating node to the target node and back, including the processing time taken by the target node and any inter-arrival delays before sending a SACK. The RTT interval is thus always current, and takes into account not only propagation delays along the communications path itself, but by including the processing time in the target node also takes into account any unusual delays occurring because of the target node. Delays in the RTT include normal situations like rerouting delays and the like, but further include any time delays created by unusually busy nodes along the communications path as well as the fact that the target node may temporarily have a high work load, creating a momentary decrease in response time. Coupled with the use of a SACK packet being generated at the non-local node for every other packet received at the non-local node, the false indications of a failed communications path due to variations in response time and bursty traffic are virtually eliminated. In addition, the detection of a failed link remains very fast.

Referring back to FIG. 1, each node has a Sent Counter 106, a Threshold Value 108, and an RTT Value 110. In the preferred embodiment, the RTT value is updated regularly so that the current amount of time a round trip is taking is always known. The threshold value is an assigned value based on heuristic knowledge of the configuration and application. In a preferred embodiment the thresholds are preferably set, jointly or separately, to some constant configuration parameters.

Threshold Value 108 as used and described in the present disclosure may be a derived value, a table lookup value, or in some implementations designed for limited or well-specified applications may be a constant. These variations and others will be apparent to one of ordinary skill in the art having the benefit of the present disclosure.

Figure 2:
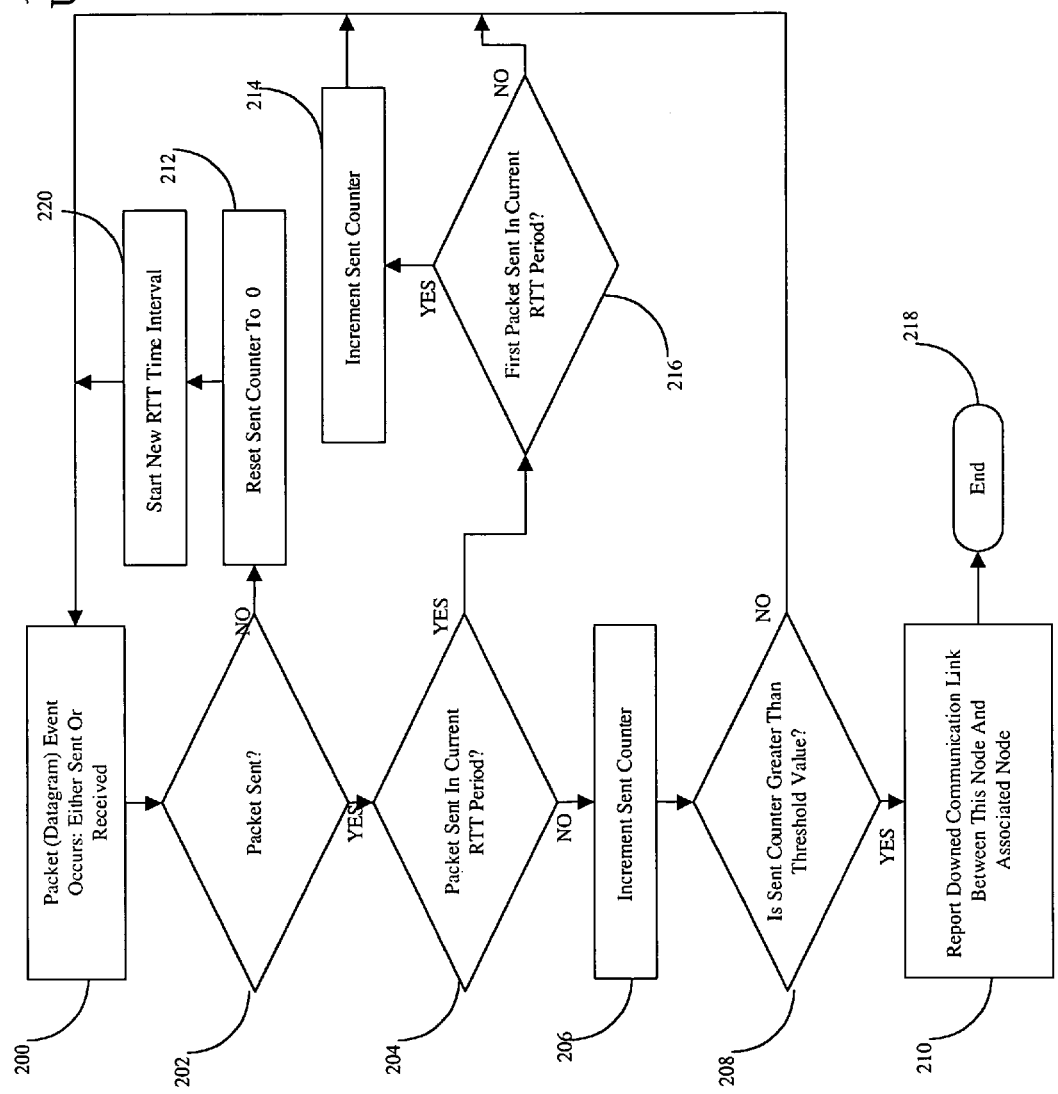
FIG. 2 is a flow chart according to the present invention.

FIG. 2 shows a process according to the present invention. This process is the same on both nodes of a communication association (both end nodes). Block 200 starts the process, where some type of packet event occurs in a communications session with a particular end node; either a packet is sent or one has been received. As soon as a packet event occurs, block 200 is left and decision point 202 entered.

Decision point 202 determines if a packet has just been sent, or if a packet has just been received from the other node in the communication association. If a packet has not been sent, then one must have just been received. In this case the "NO" exit is taken and block 212 entered.

Block 212 takes the action of resetting the local sent counter to 0. This is done because if the local node just received a packet from the non-local node, the communications path is open at least up until the delivery time of the packet just received. After resetting the local sent counter to 0, block 212 is exited and block 220 entered, where a new RTT time interval is started. After starting the new RTT time interval, block 220 is left and block 200 re-entered, waiting for the next packet event.

If, at decision point 202, the answer is yes and a packet has just been sent, then the "YES" exit is taken and decision point 204 entered.

Decision point 204 determines if this packet has been sent within the current RTT interval. The current RTT interval is the current time value associated with RTT. The value of RTT is added to the time when the last packet was received from the non-local node, and that calculated time and the current time compared. This is carried out in block 220, discussed above. If the current time is within the current RTT interval (that is, less than or equal to the value calculated by adding the RTT to time when the last packet was received from the non-local node), then decision point 204 is exited by taking the "YES" branch. Decision point 216 is now entered.

Decision point 216 determines if this is the first packet to be sent during the current RTT time interval. If so, the "YES" exit is taken to block 214. In block 214 the sent counter is incremented by one, after which the process continues back to block 200. If this is not the first packet to be sent during the current RTT time interval, the "NO" exit is taken, leading directly back to block 200 to wait for the next packet event.

The effect of this portion of the process is that, during the initial RTT time interval, the sent counter is only incremented once. This takes into account the current behavior of the communications link and the processing time of the non-local node, as no further incrementing is done until after current RTT interval has passed. Using RTT in this manner circumvents the problems of previous solutions where, because RTT was not used, incremented the sent counter regardless of any time considerations which relate to the current traversal speed of the communications link.

Returning now to decision point 204 in FIG. 2, if the packet has been sent and the current RTT time interval value has been passed, then the "NO" exit is taken and block 206 entered. The action taken in block 206 is to increment the sent counter.

The sent counter will now be incremented every time a packet is sent to the non-local node, until the local node receives another packet from the non-local node. If and when another packet is received from the non-local node, the sent counter will be reset to 0 and a new RTT time interval started. The local node is now counting how many packets it is sending after a "blank-out" time period corresponding to one round trip of the communications link.

Note: you may get packets from the non-local node during the "blank-out" period, depending on the rate the non-local node is sending packets. That is OK—the local sent counter is reset to 0 each time and a new RTT time interval started each time. In addition, as will be apparent to one of ordinary skill in the art and with the benefit of the present disclosure, it is not necessary to set the sent counter to "0" in the literal sense when using the present invention. Any preset value or base value may be used, and any method of changing the value in the sent counter may be used coupled with any value in the threshold value so long as a comparison between the two yields the desired functional state information of the communications link in question. Setting the sent counter to 0 and incrementing the sent counter by 1 in accordance with the current state of the RTT time interval when a packet is received is a preferred embodiment.

Returning now to block 206 in FIG. 2, block 206 is left for decision point 208. The current value of the sent counter is checked against the preset threshold value. If the sent counter exceeds the threshold value, the "YES" exit is taken to block 210. The action taken in block 210 is to issue a warning of some kind in the local system that the communication link between this node and the non-local node appears to be down, so the local system can take appropriate measures. Block 210 is left and endpoint 218 entered, finishing the process for this communications association (this session) between the two current end nodes.

If, at decision point 208, the sent counter value is less than the threshold value, the "NO" exit is taken which leads directly back to block 200. The next packet event will trigger the next traversal of the method shown.

The present invention thus provides a method and apparatus for determining the status in a communications link between two end nodes where each end node is using some form of packetized networking. Of particular importance is that the present invention will work using a protocol that does not include retransmit of packets (which is usually the case in a time-critical application such as VoIP). In addition to being able to detect a communications link failure using the present invention, by using RTT and the SCTP SACK packets (alternatively, any packet-oriented protocol that can be programmed to send any type of non-data or null-data packet at regular intervals) the present invention detects failures very quickly, allowing for recovery of the communications link from a user's perspective before an actual disruption occurs. And, just as important from a systems view, the current invention accounts for the actual nature of many communications links, including the creation of very bursty traffic by either an end node or an intermediate node, thus preventing the issuing of false communications failure alerts. Finally, as will be readily apparent to one of ordinary skill in the art and with the benefit of the present invention, any one end node may be supporting multiple communications sessions; each communications session may or may not have its own sent counter, RTT value, and threshold value depending on the identities of the other end nodes.

The present invention has been partially described through the use of a flow chart. As is appreciated by those of ordinary skill in the art and with the benefit of the present disclosure, the procedures described herein may be repeated as continuously, as often, or as little as necessary to satisfy the needs described and details or order of steps may vary without departing from the basic concepts of the present invention.

As will be readily apparent to a person of ordinary skill in the art and having the benefit of this disclosure, there will be a large number of possible ways of representing the data and the program running at each end node, used to implement the current invention, and how the data is stored on machine readable media at each end node. All such implementations are contemplated by the present invention, and may be used while staying within the inventive nature of the present disclosure. When speaking of a communications system within a node, any and all software and hardware components needed to complete an operation associated with any communications task within the system is intended, regardless of where those individual components may be within the node. In addition, there are many more modifications than mentioned above are possible without departing from the inventive concepts contained herein. The invention, therefore, is not to be restricted except in the spirit of the associated claims.

What is claimed is:

1. A method for detecting the status of a communications link between a first node and a second node, the method comprising:
    establishing round trip time (RTT) value for use in said first node using said second node;
    setting a sent counter in said first node to 0 and starting an RTT-based time interval in said first node when a packet is received from said second node;
    incrementing said sent counter when a packet is sent to said second node from said first node according to said RTT-based time interval; and,
    using said sent counter to determine if a failure has occurred in said communications link between said first node and said second node.

2. The method of claim 1 wherein said communications link uses an SCTP/IP-compliant protocol.

3. A method for detecting the status of a communications link between a first node and a second node, the method comprising:
    establishing an RTT value for use in said first node using said second node;
    establishing an RTT value for use in said second node using said first node;

setting a first sent counter in said first node to 0 and starting an RTT-based time interval in said first node when a packet is received from said second node;

setting a second sent counter in said second node to 0 and starting an RTT-based time interval in said second node when a packet is received from said first node;

incrementing said first sent counter when a packet is sent to said second node from said first node according to said RTT-based time interval;

incrementing said second sent counter when a packet is sent to said first node from said second node according to said RTT-based time interval; and, using either said first sent counter or said second sent counter to determine if a failure has occurred in said communications link between said first node and said second node.

4. The method of claim 3 wherein said communications link uses an SCTP/IP-compliant protocol.

5. A method for detecting the status of a communications link between two nodes, including a local and a non-local node, the method comprising:
 (a) detecting a packet event in said local node;
 (b) determining if said packet event was a packet send or packet receive event;
 (c) resetting a sent counter to 0 and starting a new RTT time interval if said packet event was a packet receive event on said local node;
 (d) incrementing said sent counter if said packet event is a send packet event and said packet event is the first send packet event to occur within the current RTT time interval on said local node;
 (e) incrementing said sent counter if said packet event is a send packet event and said packet event occurs after the expiration of the most recently started RTT time interval on said local node;
 (f) comparing said sent counter with a threshold value and issuing a communications link failure message if said sent counter is larger than said threshold value on said local node; and,
 (g) continuing with step (a) if no communications link failure message has been issued.

6. The method of claim 5 wherein said communications link uses an SCTP/IP-compliant protocol.

7. A program storage device readable by a machine, tangibly embodying a program of instructions executable by a machine for detecting the status of a communications link between two machines, including a local and a non-local machine, the method comprising:
 (a) detecting a packet event in said local machine;
 (b) determining if said packet event was a packet send or packet receive event;
 (c) resetting a sent counter to 0 and starting a new RTT time interval if said packet event was a packet receive event on said local machine;
 (d) incrementing said sent counter if said packet event is a send packet event and said packet event is the first send packet event to occur within the current RTT time interval on said local machine;
 (e) incrementing said sent counter if said packet event is a send packet event and said packet event occurs after the expiration of the most recently started RTT time interval on said local machine;
 (f) comparing said sent counter with a threshold value and issuing a communications link failure message if said sent counter is larger than said threshold value on said local machine; and,
 (g) continuing with step (a) if no communications link failure message has been issued.

8. The program storage device machine for detecting the status of a communications link between two machines of claim 7 wherein said communications link uses an SCTP/IP-compliant protocol.

9. In a local node having a communications link to a non-local node, a system for detecting the status of the communications link between the local node and the non-local node, the system comprising:
 means for detecting a packet event in said local node;
 means for determining if said packet event was a packet send or packet receive event;
 means for resetting a sent counter to 0 and starting a new RTT time interval if said packet event was a packet receive event on said local node;
 means for incrementing said sent counter if said packet event is a send packet event and said packet event is the first send packet event to occur within the current RTT time interval on said local node;
 means for incrementing said sent counter if said packet event is a send packet event and said packet event occurs after the expiration of the most recently started RTT time interval on said local node; and,
 means for comparing said sent counter with a threshold value and issuing a communications link failure message if said sent counter is larger than said threshold value on said local node.

10. The system for detecting the status of the communications link between a local node and a non-local node of claim 9, wherein said communications link uses an SCIP/IP-compliant protocol.

11. A communications link failure detection system between a first node and a second node comprising:
 a communications system operably disposed within said first node, wherein said communications system in said first node further comprises an RTT determiner component operably disposed therein, and where said RTT determiner is in operable communication with said second node and configured to establish an RTT value usable in said first node using said second node;
 wherein said communications system in said first node further comprises a sent counter operably disposed therein, and where said sent counter is further configured to be set to a value corresponding to an RTT time interval and a previous sent counter value when a packet is received from said second node; and,
 wherein said communications system in said first node further comprises a threshold value operably disposed therein, and where said threshold value is further configured to be compared to said sent counter, enabling said communications system to make a communications link status determination thereby.

12. The communications link failure detection system of claim 11 wherein said communications system uses an SCTP/IP-compliant protocol.

13. The communications link failure detection system of claim 12 where said communications system is further configured to use said SCTP/IP-compliant protocol to send a SACK-compliant packet between said first node and said second node regularly.

14. The communications link failure detection system of claim 11 where said sent counter is set to 0 at the start of a communications session.

15. The communications link failure detection system of claim 11 where said threshold value is a constant.

16. The communications link failure detection system of claim 11 where said threshold value is partially dependent on individual communications sessions.

17. A program storage device readable by a machine, tangibly embodying a program of instructions executable by a machine for detecting the status of a communications link between a first node and a second node, the method comprising:
- establishing an RTT value for use in said first node using said second node;
- setting a sent counter in said first node to a base value and starting an RTT-based time interval in said first node when a packet is received from said second node;
- incrementing said sent counter when a packet is sent to said second node from said first node according to said RTT-based time interval; and,
- using said sent counter to determine if a failure has occurred in said communications link between said first node and said second node.

18. The method of claim 17 wherein said communications link uses an SCTP/LP-compliant protocol.

19. In a first node having a communications link to a second node, a system for detecting the status of a communications link between the first node and the second node comprising:
- means for establishing an RTT value for use in said first node using said second node;
- means for setting a sent counter in said first node to a base value and starting an RTT-based time interval in said first node when a packet is received from said second node;
- means for incrementing said sent counter when a packet is sent to said second node from said first node according to said RTT-based time interval; and,
- means using said sent counter to determine if a failure has occurred in said communications link between said first node and said second node.

20. The method of claim 19 wherein said communications link uses an SCTP/IP-compliant protocol.

* * * * *